Patented Jan. 27, 1925.

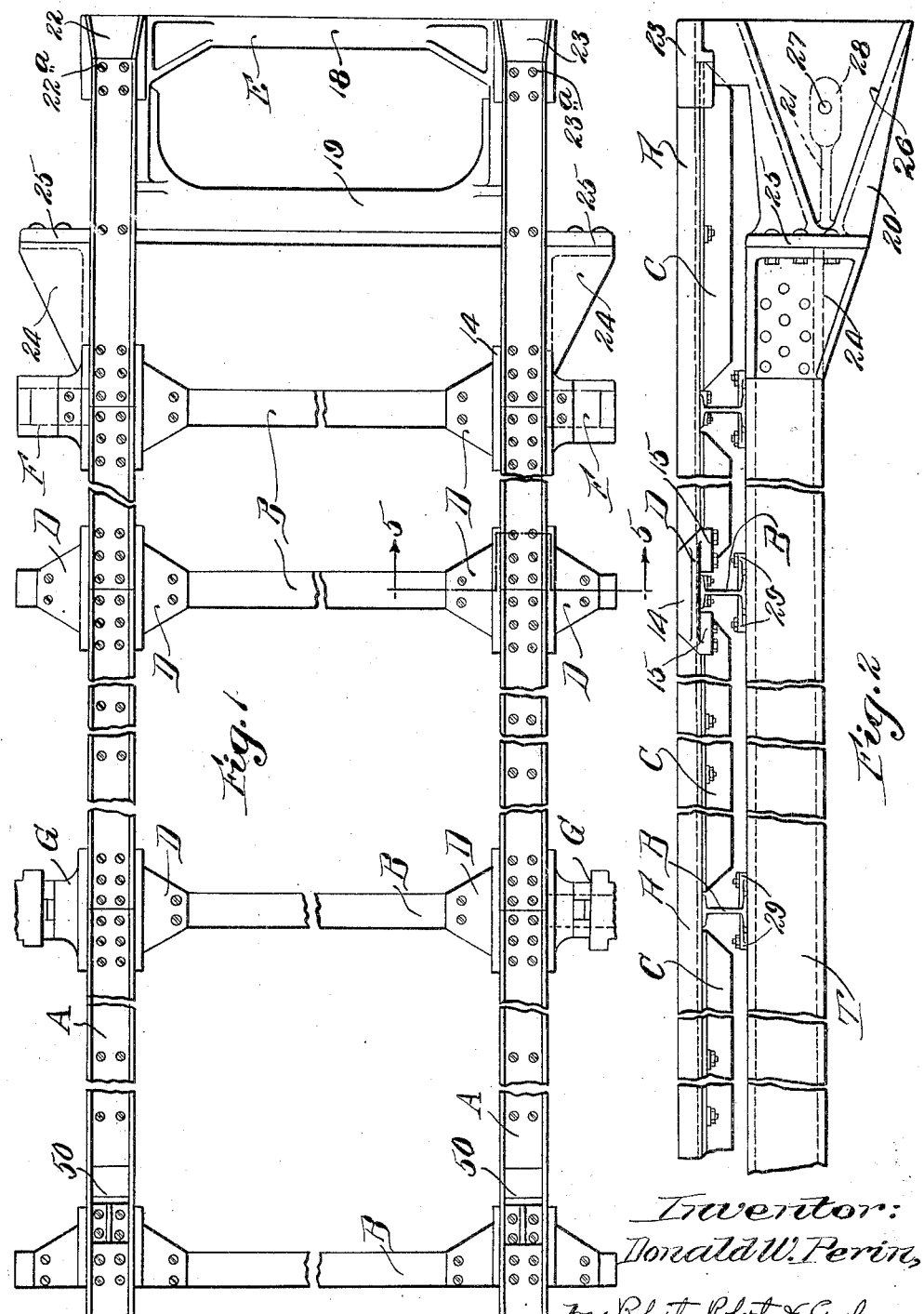

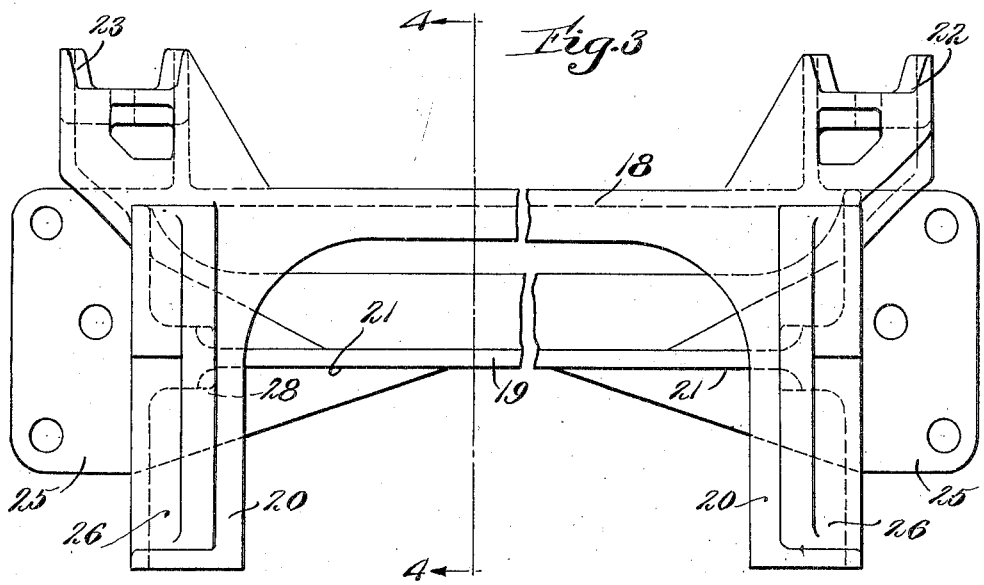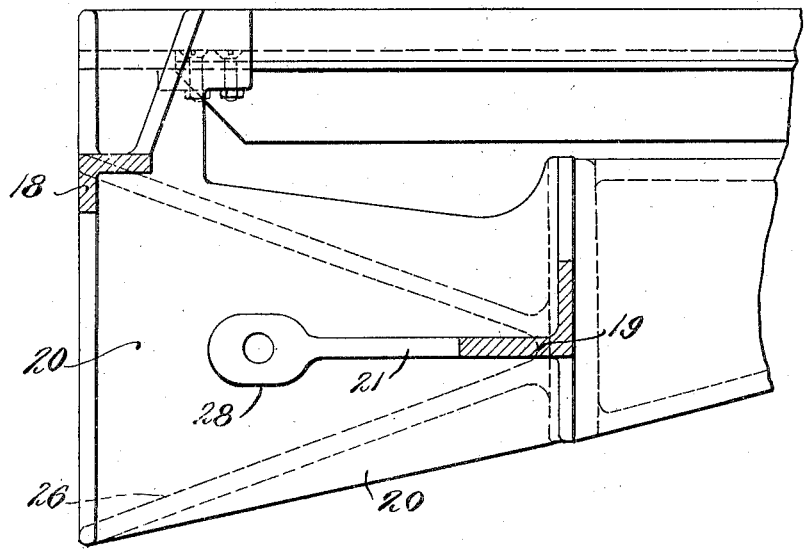

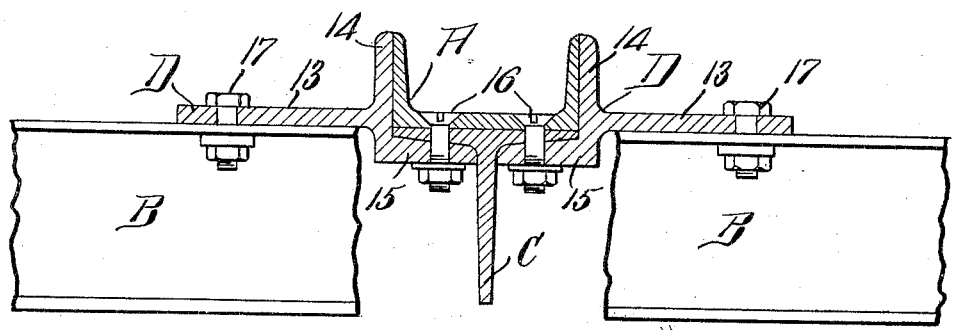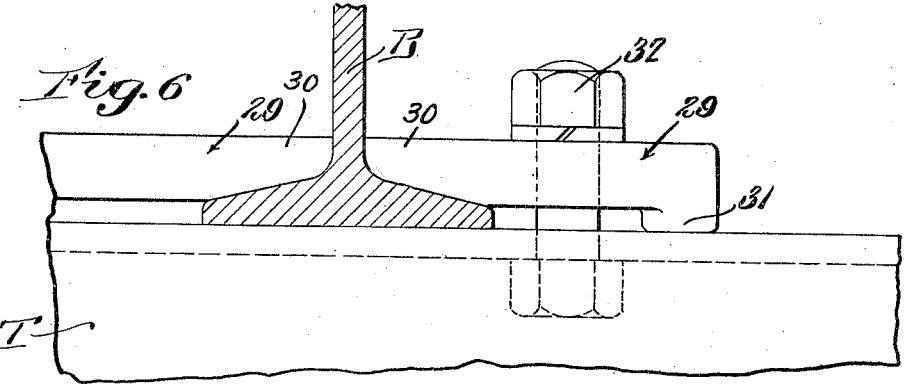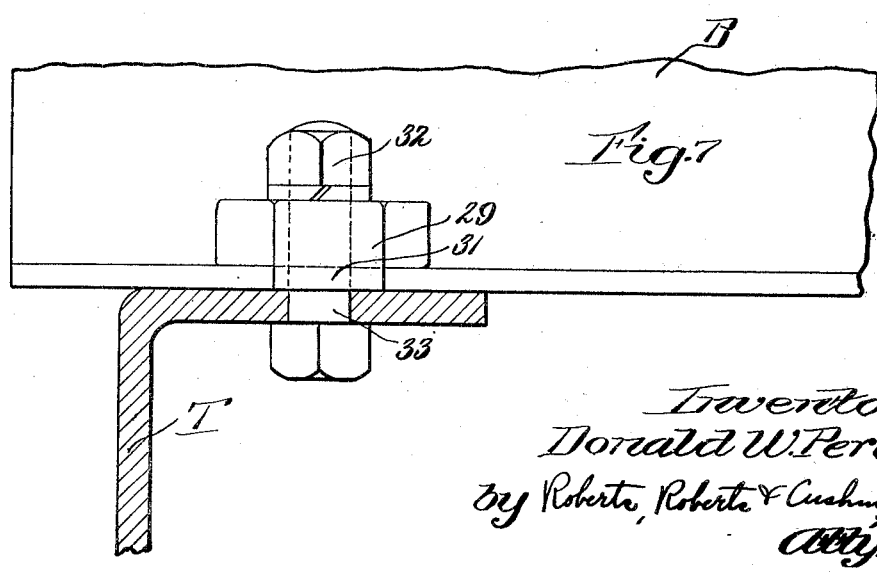

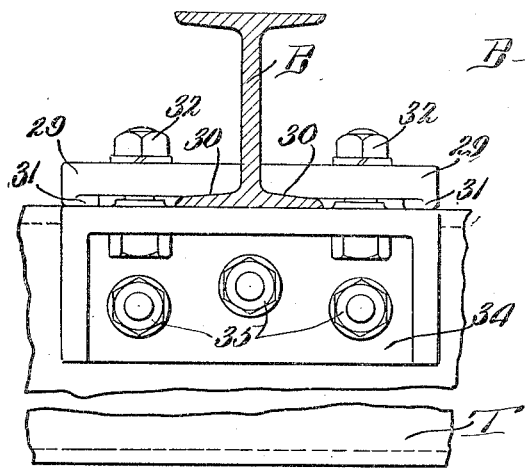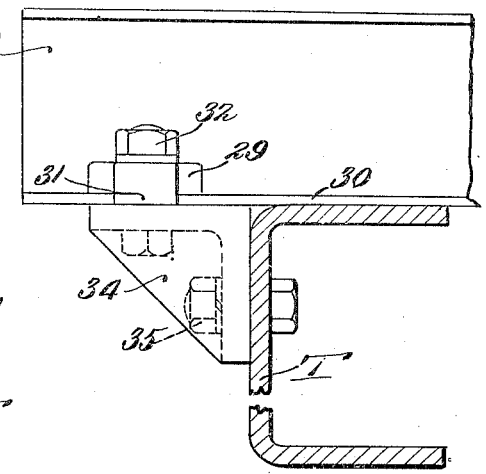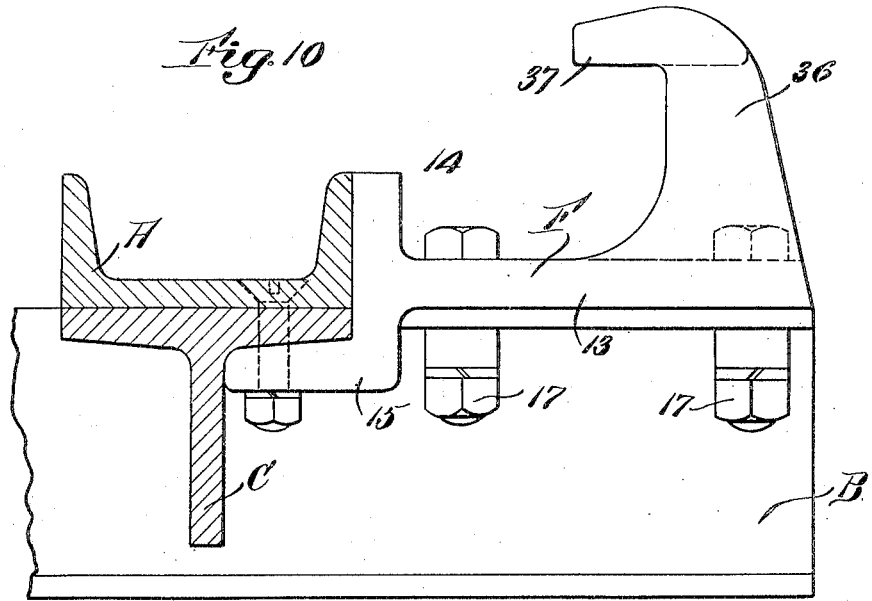

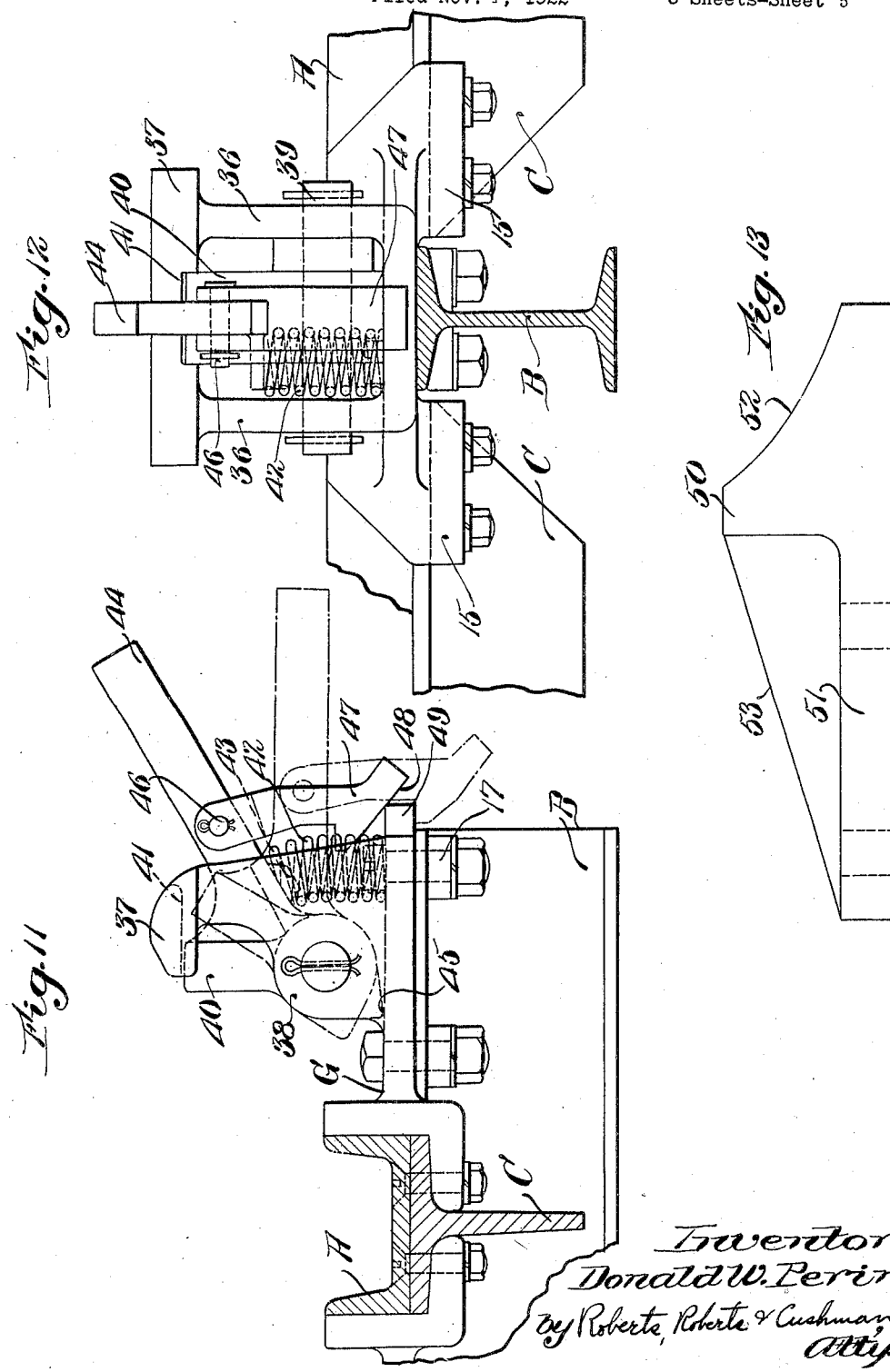

1,524,307

UNITED STATES PATENT OFFICE.

DONALD W. PERIN, OF BROOKLINE, MASSACHUSETTS, ASSIGNOR TO PERIN "ROLOFF" COMPANY, OF SOMERVILLE, MASSACHUSETTS, A CORPORATION OF MASSACHUSETTS.

FRAME FOR ATTACHMENT TO TRUCK CHASSIS.

Application filed November 1, 1922. Serial No. 598,313.

*To all whom it may concern:*

Be it known that I, DONALD W. PERIN, a citizen of the United States of America, and resident of Brookline, in the county of Norfolk and State of Massachusetts, have invented new and useful Improvements in Frames for Attachment to Truck Chassis, of which the following is a specification.

This invention relates to frames adapted for attachment to the chassis of trucks and other vehicles to adapt the latter to the use of removable bodies.

One object of the invention is to provide a frame of the character described which may be quickly and easily mounted on a chassis of any width, which is of great strength, which is compact vertically, and which can be economically constructed on a quantity basis. Other objects will be apparent from the detailed description of the invention.

The invention comprises a frame having longitudinal guide members supported by transverse members adapted to rest upon the vehicle chassis and reinforcing means for the guide members intermediate the transverse members to prevent sagging of the guide members and distortion of the frame. The invention further comprises a novel interconnection between the longitudinal and transverse members. At the rear of the frame is a transverse member of heavy construction, which may be a casting, forming an extension of the guide members and serving as a buffer for the vehicle as it approaches the loading platform. This member preferably abuts the rear of the chassis frame of the vehicle and is attached thereto in any suitable manner as by brackets on the chassis. Other means are provided for securing the frame to the chassis such as clamping and wedging members fast on the chassis beams and arranged to engage the transverse members, which are preferably I-beams. These transverse I-beams extend beyond the guide members and adapt the frame for use on a vehicle chassis of any width and provide space for the mounting of devices for securing the removable body on the frame.

For the purpose of illustrating the invention one concrete embodiment thereof is shown in the accompanying drawings in which:

Fig. 1 is a plan view partly broken away of a frame embodying the feature of the invention;

Fig. 2 is a side elevational view;

Fig. 3 is a rear elevational view of Fig. 1 partly cut away and with parts of the frame omitted;

Fig. 4 is a section on the line 4—4 of Fig. 3;

Fig. 5 is a section on the line 5—5 of Fig. 1;

Fig. 6 is a detail elevational view partly in section showing means for fastening the frame upon the truck;

Fig. 7 is a view of the parts shown in Fig. 6 taken at an angle of 90° therefrom;

Fig. 8 is a view similar to Fig. 6 showing a modification;

Fig. 9 is a view of the parts shown in Fig. 8 at an angle of 90°;

Fig. 10 is a side elevational view showing parts of the frame in section and a modified form of tie plate;

Fig. 11 is a side elevational view similar to Fig. 10 showing another form of tie plate;

Fig. 12 is an end elevational view of the tie plate and associated parts shown in Fig. 11; and Fig. 13 is a side elevational view of a stop member.

The embodiment of the invention shown for the purposes of illustration comprises a frame adapted to be mounted upon the chassis of a commercial vehicle such as a motor truck to adapt the same to the use of removable bodies. The frame comprises spaced guide members A adapted to be disposed longitudinally to the vehicle chassis. These members are preferably of channel iron with the parallel flange portions thereof disposed upwardly to form tracks for the wheels or rollers of the removable bodies but it is to be understood that any suitable or desired form of guide members may be used. Guide members or tracks A are mounted upon cross members B, disposed transversely therebeneath and adapted to rest upon the chassis beams T of the truck, as shown in Fig. 2. These transverse members are preferably in the form of I-beams providing a flat surface to rest upon the chassis beams and another flat surface to support the track members A.

To strengthen the track members A and to prevent them from sagging intermediate the cross members B under the weight of the bodies rolled thereon suitable reinforcing members C are provided. These reinforcing members are preferably in the form of sections of T iron with the bases thereof engaging the base of the track members A and with their webs depending as shown in Fig. 5. The transverse members B extend beyond tracks A as shown in Fig. 1 and adapt the frame for use upon truck chassis of any width.

At their crossing points or junctions track members A and transverse supports B are securely attached to each other by any suitable means but preferably by tie plates D. As shown in Fig. 1, these tie plates are disposed upon transverse members B on both sides of each of the tracks A, and serve to securely unite members A, B and C. Each tie plate D as disclosed in Figs. 2 and 5 comprises a portion 13 resting upon the upper face of one of the cross members B, a vertically disposed flange portion 14 engaging the vertical side of one of the track members A and longitudinally spaced depending portions 15 have substantially horizontally disposed flanges fitting the base flanges of T-plates C and abutting the webs thereof. Hence portions of the track member A, reinforcing members C, and tie plates D are disposed in superposition and these portions are united by suitable means, such as bolts 16. Other bolts 17 serve to attach the tie plates to the cross members B.

The rear end of the frame is formed by a transversely disposed member E preferably in the form of a casting comprising rear cross piece 18, front cross piece 19, and end portions 20. The cross pieces 18 and 19 of the end-casting E are angle irons, or angular in form, as indicated in Fig. 4 and from them extend reinforcing webs 21 to the end members 20. Projecting upwardly from cross members 18 and reinforced therefrom by webs as indicated in Figs. 1 and 3, are flared extensions 22 and 23 for tracks A, the ends of the tracks being made fast thereto in any suitable manner as by bolts 22ª and 23ª. The front cross piece 19 of end member E is arranged to abut the end of the chassis frame of the truck and to be attached to the longitudinal chassis beams T thereof in any suitable manner, as by means of brackets 24 fast on the chassis beams and bolted to projecting ears 25 on end member E adjacent end portions 20 thereof. These end portions 20 of the end member E may be formed with V-shaped sockets or depressions 26 corresponding to a portion of the apparatus for aligning a truck body with a loading platform such as is disclosed in my co-pending application Serial No. 539,020 filed Feb. 24, 1922, adapted to cooperate with complemental wedge members attached to the loading platform to lock the truck to the loading platform. Openings 27 are provided in the end members within sockets 26 for the locking pins, these openings extending through the bosses 28 formed on the end members 20 by reinforcing ribs 21.

Suitable means for securing the other portions of the frame to the chassis of the truck are provided comprising combined wedging and clamping members 29 having one end shaped as indicated at 30 to fit the upper surface of the lower flange of the transverse I-beams B and to wedge against the upright web thereof, and provided at the opposite end with a spacing projection 31 to dispose the upper surfaces thereof substantially horizontal (Figs. 4 and 6). These members 29 may be secured directly to the chassis beams T of the truck by bolts 32 extending through suitably positioned openings 33 in the upper flanges of the beams as indicated in Figs. 4 and 5 or they may be made fast by similar bolts 32 to one face of an angular bracket 34 the other face of which is fast to the vertical web of the chassis beam T by suitable bolts 35 as illustrated in Figs. 6 and 7.

In order to retain the removable bodies upon the frame above described suitable complemental fastening means are required both on the frame and on the removable body. The fastening means attached to the frame are preferably combined with certain of the tie plates used to unite the parts of the frame. At least four such fastening members are required on the frame, two adjacent the front and two adjacent the rear. The tie plates providing the fastening means at the rear of the frame may be arranged to prevent upward movement of the removable body and are indicated by F while the fastening members at the front of the frame indicated by G may be adapted to lock the removable body against movement in any direction. A fastening member F is shown in elevation in Fig. 10, and comprises a tie plate having the horizontal portion 13, the vertical portion 14 and the spaced depending portions 15 as on tie plates D and in addition integral upright members or brackets 36 having an inwardly disposed overhanging flange 37 horizontally disposed and extending longitudinally of the frame. The locking members G are similar in form to the fastening members F, but in addition are provided with a rockable member 38, pivoted on a shaft 39 journalled in the uprights 36. The rockable member 38 has an arm 40 forming a latch adapted to cooperate with suitable spaced lugs on the removable body in the manner disclosed in my Patent No. 1,418,966 issued June 6, 1922. Latch 40, as indicated in Figs. 11 and 12, swing through a slot 41 in the cross piece forming flange 37. To retain latch 40 normally in its latching or operative position (shown in full lines in Fig. 11) coil spring 42 is provided, one end of which is retained in place by the top of one of the bolts 17, which fastens portion 13 of the plate to cross piece B, and the other end engages a projection 43 on an actuating arm 44 fast to or integral with member 38. Movement of member 38 under the action of the spring is limited by a suitable stop 45. Pivoted to actuating lever 44 at 46 is a depending gravity operated hook 47 having an inclined face 48 arranged so that when lever 44 is pulled downwardly hook 47 is swung outwardly until it drops below the projecting end 49 of the plate G, as indicated in dotted lines in Fig. 11, to retain latch 40 in inoperative position while removable bodies are being changed.

In order to save time in properly disposing a removable body upon the frame stops 50 are provided adapted to be fastened in tracks A adjacent the front of the frame as shown in Fig. 1. One of these stops is shown in side elevation in Fig. 13, and comprises a base 51 of a size to fit within the track members A having an integral upstanding portion provided with a curved face 52 adapted to substantially fit the face of a wheel or roller on the removable body. The upstanding front of the stop may be strengthened by a centrally disposed web 53.

In attaching the frame herein disclosed to the chassis of a motor truck brackets 24 are first made fast adjacent the ends of the chassis beams and the end casting E of the frame is attached thereto by bolts extending through the ears 25 of the casting. The rest of the frame is then placed as a unit upon the chassis beams T with guide members A in alignment with the extensions 22 and 23 thereof on the casting. The frame is attached to the casting by the bolts 22$^a$ and 23$^a$ extending through track members A respectively. The frame is then made fast to the chassis beams T at other points by means of the combined wedging and clamping blocks 29 which are attached either directly to the chassis beams themselves or to brackets fastened thereon as heretofore described. The operation of loading and unloading a removable body on a frame of this kind is described in the patent above identified and will furthermore be obvious for the structure herein described.

From the above it will be evident that a frame has been provided for quick and easy attachment to the chassis beams of a motor truck to adapt the truck to the use of removable bodies, that the parts of the frame are securely united by means such as the tie plates D, that the longitudinally disposed tracks are strongly reinforced against bending or sagging under heavy loads by the T sections C, and that the casting forming the end of the frame provides a flared guide for the rollers of the removable body and by reason of its secure attachment to the chassis beams of the truck further provides an efficient buffer for withstanding the shocks incident to backing the truck against the loading platform to engage the sockets 26 therein with the aligning apparatus on the platform.

I claim:

1. A frame, adapted to be mounted upon a truck chassis to receive a removable body thereon, comprising longitudinal guide members, spaced transverse supports for said guide members adapted to rest upon the truck chassis, and reinforcing means for said guide members interposed between said transverse members.

2. A frame, adapted to be mounted upon a truck chassis to receive a removable body thereon, comprising spaced longitudinal guide members, spaced transverse supporting members extending beneath said guide members and adapted to rest upon the truck chassis, and reinforcing members extending along the under sides of said guide members between said transverse members to prevent the guide members from sagging.

3. A frame, adapted to be attached to a truck chassis to receive thereon a removable body, comprising longitudinal track members, transverse members supporting said track members and adapted to be made fast to the truck chassis, reinforcing members extending beneath said track members, and means including tie plates for fastening all said members together at the junctions of said track and transverse members.

4. A frame, adapted to be attached to a truck chassis to receive thereon a removable body, comprising longitudinal track members, transverse members supporting said track members and adapted to be made fast to the truck chassis, reinforcing members extending beneath said track members and means for fastening all said members together at the crossing points of said track and transverse members including tie plates engaging all said members.

5. A frame, adapted to be attached to a truck chassis to receive thereon a removable body, comprising spaced channels forming tracks for the removable body, spaced I-beams disposed transversely beneath the channels to support the same and adapted to rest upon the chassis beams of the truck, reinforcing means for said channels comprising T-beams extending between the I-beams with the bases thereof disposed against the bases of the channels, and means uniting all said parts.

6. A frame, adapted to be attached to a truck chassis to receive thereon a removable body, comprising spaced channels forming tracks for the removable body, spaced I-beams disposed transversely beneath the channels to support the same and adapted to rest upon the chassis beams of the truck, reinforcing means for said channels comprising T-beams extending between the I-beams with the bases thereof against the bases of the channels, and means including tie plates for fastening said parts together at the junctions of the channels and I-beams.

7. A frame, adapted to be attached to a truck chassis to receive thereon a removable body, comprising spaced channels forming tracks for the removable body, I-beams disposed transversely beneath the channels to support the same and adapted to rest upon the chassis beams of the truck, reinforcing means for said channels comprising T-beams extending between the I-beams with the bases thereof against the bases of the channels, and means uniting all said parts at the junctions of said channels, and I-beams including tie plates having portions abutting portions of all said parts.

8. A frame, adapted to be attached to a truck chassis to receive thereon a removable body, comprising spaced channels forming tracks for the removable body, I-beams disposed transversely beneath the channels to support the same and adapted to rest upon the chassis beams of the truck, reinforcing means for said channels comprising T-beams extending between the I-beams with the bases thereof against the bases of the channels, and tie plates uniting said members at their junctions, each tie plate comprising a horizontal portion resting upon the top of an I-beam, and a downwardly offset portion extending beneath superposed portions of an adjacent channel and reinforcing T-beam.

9. A frame, adapted to be attached to a truck chassis to receive thereon a removable body, comprising spaced channels forming tracks for the removable body, I-beams disposed transversely beneath the channels to support the same and adapted to rest upon the chassis beams of the truck, reinforcing means for said channels comprising T-beams extending between the I-beams with the bases thereof against the bases of the channels, and tie plates uniting said members at their junctions, each tie plate comprising a horizontal portion resting upon the top of an I-beam and downwardly offset portions extending beneath superposed portions of adjacent channels and reinforcing T-beams.

10. A frame, adapted to be attached to a truck chassis to receive thereon a removable body, comprising spaced channels forming tracks for the removable body, transverse I-beams beneath the channels to support the same and adapted to rest upon the chassis beams of the truck, reinforcing means for said channels comprising T-beams extending between the I-beams with the bases thereof against the bases of the channels, and tie plates uniting said members at their junctions, each tie plate comprising a horizontal portion resting upon the top of an I-beam, an upright portion abutting one side of a channel, and horizontally spaced downwardly offset portions extending beneath adjacent channels and T-beams.

11. In a frame adapted to be mounted upon a truck chassis and consisting of transverse members supporting longitudinal members, means for uniting said members adjacent the crossing points comprising tie plates having portions engaging the tops of the transverse members, portions engaging vertical faces of the longitudinal members and downwardly offset portions extending beneath the longitudinal members.

12. In a frame adapted to be mounted upon a truck chassis for receiving a removable body thereon and comprising transverse members supporting longitudinal members, means for uniting said members adjacent the junctions of said members including tie plates having portions engaging both said members and having means adapted to engage complemental means on the removable body to securely retain the latter on the frame.

13. In a frame adapted to be mounted upon a truck chassis for receiving a removable body thereon and comprising transverse members supporting longitudinal members, means for uniting said members adjacent the junctions of said members including tie plates having portions engaging both said members and having integral projections adapted to engage complemental projections on the removable body to securely retain the latter on the frame.

14. In a frame adapted to be mounted upon a truck chassis for receiving a removable body thereon and comprising transverse members supporting longitudinal members, means for uniting said members adjacent the junctions of said members including tie plates having portions engaging both said members, certain of said plates having integral brackets projecting therefrom with inwardly extending flanges adapted to cooperate with complemental members on the removable body to securely retain the latter on the frame.

15. In a frame adapted to be mounted upon a truck chassis for receiving a removable body thereon and comprising transverse members supporting longitudinal track members, means for uniting said members adjacent their junctions including tie plates having portions engaging both said members, certain of said plates having integral brackets projecting therefrom with inwardly extending flanges and latches adapted to cooperate with complemental members on the removable body to retain the latter on the frame.

16. In a frame adapted to be mounted upon a truck chassis for receiving a removable body thereon and comprising transverse members supporting longitudinal track members, means for uniting said members adjacent their junctions including tie plates having portions engaging both said members, certain of said plates having integral brackets projecting therefrom with inwardly extending flanges and latches adapted to cooperate with complemental members on the removable body to retain the latter on the frame, and a stop on one of said track members adapted to halt the removable body in position to be engaged by said latches.

17. A frame, adapted to be mounted upon a truck chassis to receive thereon a removable body, comprising longitudinal track members, transverse members supporting said track members, and adapted to rest upon the truck chassis, reinforcing members for said track members disposed therebeneath intermediate said transverse members, tie plates uniting said members at their junctions, portions of said track members, reinforcing members and plates being in superposition and fastening members extending through said superposed portions.

18. A frame, adapted to be mounted upon a truck chassis to receive thereon a removable body, comprising longitudinal track members, transverse members supporting said track members and extending therebeyond, tie plates having portions extending over said transverse members on opposite sides of said track members for uniting said members.

19. A frame adapted to be mounted upon a truck chassis to receive thereon a removable body comprising longitudinal track members, transverse members, tie plates uniting said members at their junctions, and means on certain of said plates adapted to cooperate with complemental means on the removable body to retain the latter on the frame.

20. A frame adapted to be mounted upon a truck chassis to receive thereon a removable body comprising transverse members and longitudinal track members, tie plates uniting said members at their junctions, and means integral with certain of said plates adapted to cooperate with complemental means on the removable body to retain the latter on the frame.

21. A frame, adapted to be mounted upon a truck chassis to receive thereon a removable body, comprising longitudinal track members, supports for said members adapted to rest upon the chassis beams of the truck, and a member connected to said track members at their rear ends and forming extensions thereof, said member being arranged to abut the rear end of the chassis frame of the truck and to be made fast thereto.

22. A frame, adapted to be mounted upon a truck chassis to receive thereon a removable body, comprising track members and cross members supporting said track members, one of said cross members having a portion abutting the rear end of the chassis frame of the truck and secured thereto.

23. A frame, adapted to be mounted upon a truck chassis to receive thereon a removable body, comprising track members and cross members united thereto said cross members being arranged to be fastened to the chassis beams of the truck, the rear cross member having portions abutting the ends of the chassis beams and other portions forming extensions of said track members.

24. A frame, adapted to be mounted upon a truck chassis to receive thereon a removable body, comprising track members and cross members united thereto, said cross members being arranged to rest upon the chassis beams of the truck and to be fastened thereto, a member at the rear of the frame forming a buffer, said member extending beneath said track members and having a portion arranged to abut the ends of the chassis beams, and means attaching said member to the chassis beams.

25. A frame, adapted to be mounted upon a truck chassis to receive thereon a removable body, comprising track members and cross members united thereto, said cross members being arranged to rest upon the chassis beams of the truck and to be fastened thereto, a member at the rear of the frame forming a buffer, said member extending beneath said track members and having a portion arranged to abut the ends of the chassis beams, ears extending from said portion adapted to be fastened to said beams.

26. A frame, adapted to be mounted upon a truck chassis to receive thereon a removable body, comprising longitudinal track members, transverse members supporting said track members, and clamps adapted to be attached to the chassis beams of the truck on both sides of said transverse members to secure the latter thereon.

27. A frame, adapted to be mounted upon a truck chassis to receive thereon a removable body, comprising track members and transverse I-beams supporting said track members and adapted to rest upon the chassis beams of the truck, and members having portions fitting the flanges of the I-beams for clamping the latter upon the chassis beams.

28. A frame, adapted to be mounted upon a truck chassis to receive thereon a removable body, comprising track members and transverse I-beams supporting said track members and adapted to rest upon the chassis beams of the truck, and combined wedging and clamping members having portions fitting the flanges and abutting the webs of the I-beams for clamping the latter upon the chassis beams.

29. A frame, adapted to be mounted upon a truck chassis to receive thereon a removable body, comprising longitudinal track members, transverse I-beams supporting said track members and adapted to rest on the chassis beams of the truck, an end casting forming extensions of said track members and having a portion abutting the ends of the chassis beams, and means for securing said I-beams and said casting to said chassis beams to hold the frame upon the chassis.

30. A frame, adapted to be mounted upon a truck chassis to receive thereon a removable body, comprising longitudinal track members, transverse I-beams supporting said track members and adapted to rest on the chassis beams of the truck, a buffer providing extensions for said track members and having a portion abutting the ends of the chassis beams and arranged to be secured thereto, and means secured to the chassis beams to engage the lower flanges of said I-beams to retain the frame upon the chassis.

31. A frame, adapted to be mounted upon a truck chassis to receive thereon a removable body, comprising longitudinal track members, transverse I-beams supporting said track members and adapted to rest on the chassis beams of the truck, a buffer providing extensions for said track members and having a portion abutting the ends of the chassis beams and arranged to be secured thereto, and combined wedging and clamping members adapted to be attached to said chassis beams to engage the lower flanges of said I-beams to retain the frame upon the chassis.

32. A frame, adapted to be mounted upon a truck chassis to receive thereon a removable body, comprising longitudinal track members, transverse I-beams supporting said track members and adapted to rest on the chassis beams of the truck, a buffer providing flared extensions for said track members and having a portion abutting the ends of the chassis beams, ears on said portion secured to said chassis beams, and clamps on said chassis beams engaging the lower flanges of said I-beams to retain the frame upon the chassis.

33. A frame, adapted to be mounted upon a truck chassis to receive thereon a removable body, comprising longitudinal track members, transverse I-beams supporting said track members and adapted to rest on the chassis beams of the truck, means reinforcing said track members intermediate said I-beams, a buffer providing extensions for said track members and having a portion abutting the ends of the chassis beams, and means for securing said I-beams and said buffer to said chassis beams to hold the frame upon the chassis.

Signed by me at Boston, Massachusetts, this 28th day of July, 1922.

DONALD W. PERIN.